(12) United States Patent
Maubant et al.

(10) Patent No.: US 6,578,434 B1
(45) Date of Patent: Jun. 17, 2003

(54) TENSILE TESTING SENSOR FOR MEASURING MECHANICAL JAMMING DEFORMATIONS ON FIRST INSTALLATION AND AUTOMATIC CALIBRATING BASED ON SAID JAMMING

(75) Inventors: Philippe Maubant, Riquewihr (FR); Yvon Rancourt, Quebec (CA)

(73) Assignee: Newtech Mecatronic Inc., Blainville (CA)

( * ) Notice: Subject to any disclaimer, the term of this patent is extended or adjusted under 35 U.S.C. 154(b) by 0 days.

(21) Appl. No.: 09/638,547

(22) Filed: Aug. 16, 2000

Related U.S. Application Data (63) Continuation of application No. PCT/CA99/00136, filed on Feb. 16, 1999.

(30) Foreign Application Priority Data

Feb. 16, 1998 (CA) .............................................. 2230001

(51) Int. Cl.⁷ ................................................. G01N 3/20
(52) U.S. Cl. ....................................................... 73/849
(58) Field of Search ........................ 73/789, 790, 796, 73/812, 826, 818, 849, 853, 854

(56) References Cited

U.S. PATENT DOCUMENTS

| | | |
|---|---|---|
| 2,666,262 A | 1/1954 | Ruge |
| 3,411,348 A | 11/1968 | Schultheis |
| 3,780,817 A | 12/1973 | Videon |
| 3,879,998 A * | 4/1975 | Bradley ................. 73/862.628 |
| 4,493,220 A * | 1/1985 | Carignan et al. ....... 73/862.628 |
| 5,355,715 A | 10/1994 | Rausche et al. |
| 5,522,270 A | 6/1996 | Gissinger et al. |
| 5,983,729 A * | 11/1999 | Taylor ................... 73/862.474 |

FOREIGN PATENT DOCUMENTS

| | | |
|---|---|---|
| CA | 2198537 | 9/1998 |
| WO | WO9829671 | 7/1998 |

* cited by examiner

*Primary Examiner*—Max Noori
(74) *Attorney, Agent, or Firm*—Birch, Stewart, Kolasch & Birch, LLP (57) ABSTRACT

The invention concerns a tensile testing sensor mounted on a mechanical member wherein forces to be measures develop comprising a bendable metal blade (1, 22) provided with measuring gauges (2, 23) implanted and positioned on the blade. Said blade (1, 22) is sensitive to mechanical tensile and compressive deformations sustained and transmitted via two bearing parts (4, 5, 20) coupled to the mechanical member wherein the forces develop. The sensor is equipped with a mechanically locking flange (31) placed during calibration between the bearing parts (4, 5, 20) and the sensor blade.

28 Claims, 7 Drawing Sheets

TENSILE TESTING SENSOR FOR MEASURING MECHANICAL JAMMING DEFORMATIONS ON FIRST INSTALLATION AND AUTOMATIC CALIBRATING BASED ON SAID JAMMING

This application is a Continuation of PCT International Application No. PCT/CA99/00136 filed on Feb. 16, 1999, which designated the United States and on which priority is claimed under 35 U.S.C. §120, the entire contents of which are hereby incorporated by reference.

FIELD OF INVENTION

Sensors are elements that permit the measurement of physical phenomena that are conventionally designated as size or parameters. They translate the state or evolution of these sizes or parameters in the form of electrical signals. They thus provide information on the development of and, subsequently, the static and dynamic behaviors of the processes in which they are implemented.

DESCRIPTION OF THE PRIOR ART

Sensors are currently widely available and are used in virtually all sectors of activity. They are used to measure temperature, pressure, position and level to cite only the most important. Studies and catalogs prepared, by specialists set out their characteristics as well as their uses. By virtue of these catalogs, it is possible to know the magnitude of the electrical signals corresponding to the physical size or parameter being determined. The term of "conversion scale" is used to mean that there exists a coherent relationship between the physical size and the electrical signal. For example, if one considers a pressure sensor, an electrical signal magnitude in the form of a voltage or a current will correspond to the pressure magnitude of the sensor.

Current physics, electrical and electronic technologies allow to conceive and build a sensor. The ease of fabrication and use of a sensor will determine its cost, the areas in which it will be used and, in consequence, its market.

Certain sensors are not as easily designed for reasons that are linked to the nature of and the manner in which a physical parameter is available. For sensors intended to measure forces, even if it is, in principle, easy to measure a force which develops in a metal part, the capture of this force, economically, is not so simple.

The measure of forces that are applied to a metal part usually takes into account the deformation of the material submitted to tensile strain, compression, torsion strain and/or the combination of the action of these forces.

The size of the deformation as a function of the forces acting thereon determines the gradient, that it to say the precision by which one can evaluate the elementary distortion. It is therefore essential to know the relationship between such deformations in microns or millimeters and the forces applied on the part.

The gradient is determined by a mathematical study of the resistance of the materials used, to which is correlated, according to the drawing of the part, a simulation of the finite elements in order to establish the relationship between the deformations and of the forces.

It is readily apparent that it is not easy to know the totality of the gradients because of the diversity of the materials and the shapes of the parts. Each part is a particular instance and, to use a sensor destined to measure forces or deformations, a certain number of rules must be respected. The exact locations where the forces develop and what are the maximum and minimum deformations that are produced by the result of these forces must be precisely known.

Once these elements are known, a few components and techniques allow to obtain an electrical signal which is representative of the deformations which develop in the part. These components are constraint gauges, piezo resistive elements, capacitive elements, optical devices that allow to measure the change in granulometric orientation of materials or ferro-magnetic components whose displacement in a magnetic field determines an electrical signal in relation with the deformation of the part.

Currently, even if these components are known and regularly implemented, their setting up on a mechanical member is not easy and the repetitivity of the value of the information is not very constant when one adds or replaces a sensor by another. It is necessary, in most cases, to recalibrate the sensor and, in doing so to, adjust the zero and the scale of the electrical signals.

The sensors destined to measure forces are usually implemented according to two methods.

The first method consists of sticking a bridge of constraint gauges to the location of the deformation. In this case, the value of the signal is closely related to the precision by which the bridge of gauges is positioned and oriented on the part, and to the uniformity of the pressure with which the bridge of gauges is applied to the part. It is not possible to precisely position the bridge of gauges mechanically with respect to the development location of the forces on the piece because of its own nature. Since the signal of the bridge of resistive gauges is, for example, determined by the equation $R = p\, L/S$ wherein R is the value of the resistance which evolves in function of the elongation and of the section of the conductor which forms the bridge of gauges, p is the resistivity of the materials forming the resistor, L is the length of the conductor and S is its section, the values of L and S may be affected by the method used to position the bridge of gauges. This is true with bridges, whatever technology: piezo resistive, capacitive or other, when the gauges are positioned directly on pieces for which the mechanical state is rough and the dimensions are average or important.

The second method consists of sticking a bridge of gauges on a metal blade whose characteristics are known as described in the patent application Ser. No. CA 2,198,537 filed Feb. 26, 1997, and thus ensuring a repetitivity in the relationship between the mechanical deformation of the and the variation of the resistance of the element of the bridge if a resistive bridge is used for example and then mounting the blade on a mechanical member on which forces develop. The problem in this case is that the materials of the blade are not necessarily of the same nature than the materials that form the mechanical devices and that the adaptation of the assembly of the blade with the mechanical members is difficult when setting up the sensor in the mechanical environment while keeping a constant relationship between the physical size and the electrical signal calibrated during fabrication. It is thus necessary to take into account the installation of the sensor to optimize the scale of conversion of the mechanical forces into electrical signals.

Figures 4, 5:
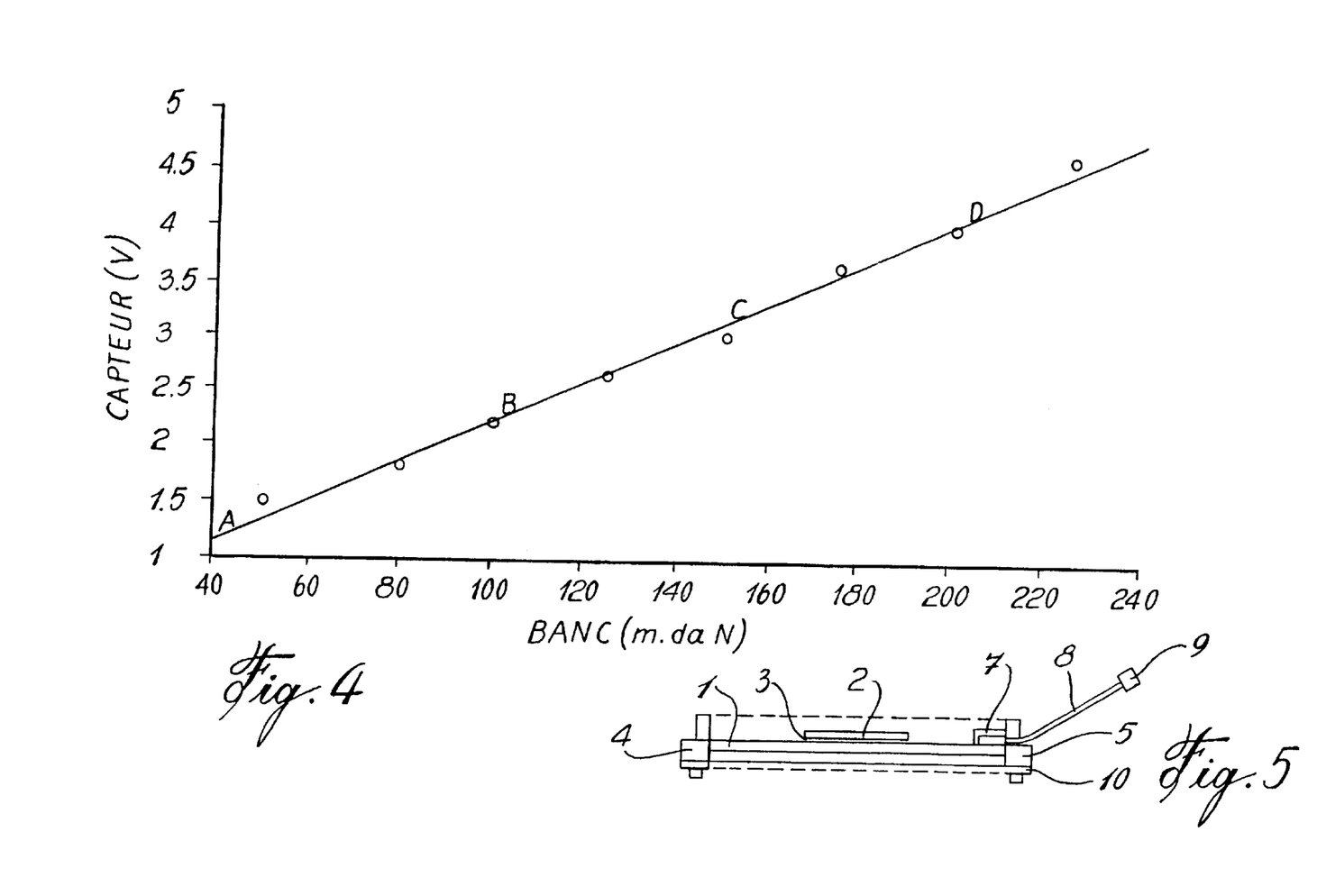
FIG. 4 is a table that gives the electrical signal delivered by the sensor when it is mounted on a braking bench.
FIG. 5 is an elevation view of the blade with the bridge of gauges and the locking flange.

U.S. Pat. No. 5,522,270 by Gissinger et al. describes a device to measure the stress exerted on a mechanical member and a method to install this device. A gauge generates an electrical current in accordance to the stress exerted on the part. The gauge is pre-bent in plant as illustrated in FIG. 5 with four tension points located at the folds. The problem that person skilled in the art have identified with this device is that the points of tension make the buckling a lot less precise. Furthermore, the repetitivity of the buckling is difficult as each blade reacts differently because of the tension points. By stretching the Gissinger et al. gauge by points A and B, the blade can buckle but the settings will not be very precise since the forces are modified by the folds. Stretching the blade of Gissinger et al. By points A and B does not permit a linear deformation of the blade. Furthermore, the suggested fastening methods cause a total embedment of the ends. They are susceptible of causing in the blade and in the folding rays very high constraints. They also make the blade very sensitive to undesirable constraints such as deformations due to installation and thermal constraints generated by the temperature variations of the part to be measured. These constraints can induce a signal highly superior to the size to measure. It is necessary to find a configuration of the blade that will allow a repetitivity of the buckling and the construction of the device.

OBJECTS OF THE INVENTION

Taking into consideration these constraints leads to trying to eliminate the disadvantages previously cited and to make the relationship between the mechanical piece and the sensor as accurate as possible.

The present invention considers that tensile testing is the way to measure forces. It describes the processes, which will allow implantation of a sensor in a device to be measured and will ensure repetitivity.

SUMMARY OF THE INVENTION

Repetitivity is the relationship between the deformation of the sensor to which it is subjected and the electrical signal it delivers. This repetitivity imposes that the relationship of the deformation of the receiving piece to be measured is in correspondence with the deformation of the internal blade of the sensor and that the initial jamming of the sensor and the adjustment to its scale of conversion be thus compatible before and after assembly on the receiving piece.

For example, MultiDyn commercializes a sensor equipped with two bearing parts, a blade on which is mounted a bridge of gauges as described in existing literature. During the mounting of the sensor with the mechanical members, the deformations that are produced in the sensor are transmitted to the bearing parts of the blade which cause a tensile or a compressive strain of the blade. This is translated into the bridge of gauges by a variation of the resistance of the components that make up the branches of the bridge and consequently of the electrical signal at the terminals of the bridge. The calibration curve of the sensor established during fabrication is thus falsified, which forces a carrying out of a new calibration on site, which does not guarantee the accuracy of the relationship between physical size and electrical signal and increases the time and cost of assembly.

This invention can advantageously replace all of these types of tensile sensors and can be used as a sensor for stress, torque, and in certain cases, as a sensor for displacement.

Here are thus the main problems of the existing sensors that this invention can replace. Many of these tensile sensors are adapted to certain types of use but all have disadvantages. The resistive gauges glued or welded directly on the structure to be measured are devices which are very reliable and accurate. However, their direct implantation requires laboratory work and is not possible without taking great and costly precautions, that is why, for common measurements, they are generally coupled to a test body easier to implement. The methods of external observation of the structure, with or without preparation of the surface, such as the photoelastometry, moire, crackling polish, holography, X diffraction, are rather used as laboratory techniques of laboratory constraint analysis.

The test bodies equipped with gauges replacing a part of the structure, or inserted at the points of transmission of stress, are very costly, hard to install, and often provoke a weakening of the structure. The test bodies coupled to these structures generally show high stiffness, the stress at the abutments is very high and the influence on the structure may be important. The sliding at the abutments is hard to avoid, provoking important errors of return to zero setting and of hysteresis. The mechanical tensile sensors are delicate to install and are fragile and costly. The piezo-electrical sensors only work in compression, require high pressure and a complicated assembly. Furthermore, they only take into account the dynamic signals. And finally, piezo-resistive sensors are very fragile (silicone cells) and derive enormously in temperature.

The aim of the invention is to bring a solution to the problem described above by maintaining the bearing parts of the blade stationary between the moment of the calibration of the sensor on a calibration bench and the mounting on the mechanical member.

The invention consists in adjusting the offset and the gain by mechanically varying the dimension between the axes of the bearing parts, then, once the adjustment of the linearity of the curve is obtained, to adjust the offset for a value of the electrical signal corresponding to a known dimension and, then, to lock the degrees of freedom by a permanent mechanical device with the help of a flange. The flange is made of a film of metallic material, composite or polymer, and is placed between the bearing parts. It keeps the adjustment of the calibration made on the bench until the mounting of the sensor on the mechanical member by known classical industrial processes of bonding, welding or other. When the sensor and the mechanical member are coupled, and thus strictly bound to one another, one proceeds with the rupture of the flange and this ensure a amming without further adjustment at mounting. The rupture of the flange allows to free the functioning of the sensor.

The improvement of the device with respect to the other existing devices up to date is the ease of installation and the reduced cost while keeping excellent precision and reliability. Furthermore, it is robust, mobile, reusable and not very sensitive to mechanical disturbances.

Another embodiment of the invention comprises a tensile testing sensor that includes two abutments capable of being fastened jointly to a mechanical member to be measured, an elastic blade isostatically supported at its ends between the two abutments upon which the elastically blade is kept in flexion by buckling, means to measure the deformation of the elastic blade resulting from the displacement of the abutments in order to determine the section in the mechanical member.

BRIEF DESCRIPTION OF THE DRAWINGS

We will describe with more details hereinafter, in an indicative form and by no means limitative, a device in accordance with this invention with reference to the annexed drawings on which.

DETAILED DESCRIPTION OF THE PREFERRED EMBODIMENTS OF THE INVENTION

The description of the sensor (FIG. 1) allows a better understanding of the invention. The sensor comprises a blade 1 on which is placed a bridge of gauges 2 of resistive semi-conductor, piezo resistive, capacitive or other. The position of the bridge and a bonding film 3 allow to jointly bond elements 1 and 2. The ends of the blade are equipped with bearing parts 4 and 5. A flexible and supple envelope 6 ensures the protection of the bridge of gauges and of the amplifier electronics 7 for the signals delivered the bridge of gauges 2. The connection between the bridge of gauges and the electronics is made by conductors according to rules of the art.

Figure 1:
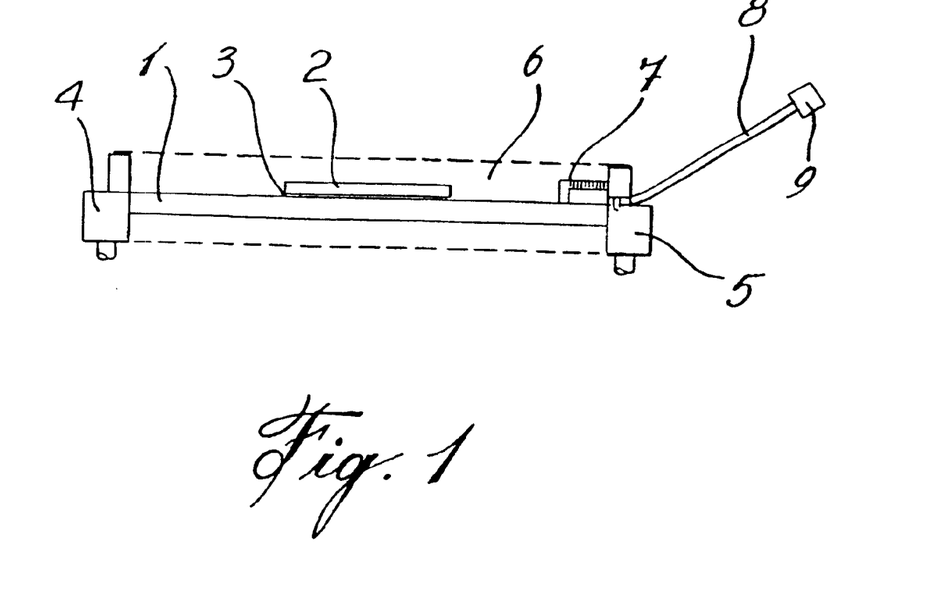
FIG. 1 is an elevation view of a blade on which is installed a bridge of gauges.

The amplifier electronics are integrated to one of the bearing parts 4 or 5 and the information is delivered to the exterior of the sensor by means of a conductor 8 equipped with a connector 9. There are 3 or 4 points of connection. The information can also, depending on the applications, be delivered by the implementation of such transmission methods, as radio waves, hyperfrequencies, when one adds to the amplifier electronics module 7 and an extra transmission module such as one made by Motorola or SGS Thomson.

Figure 2:
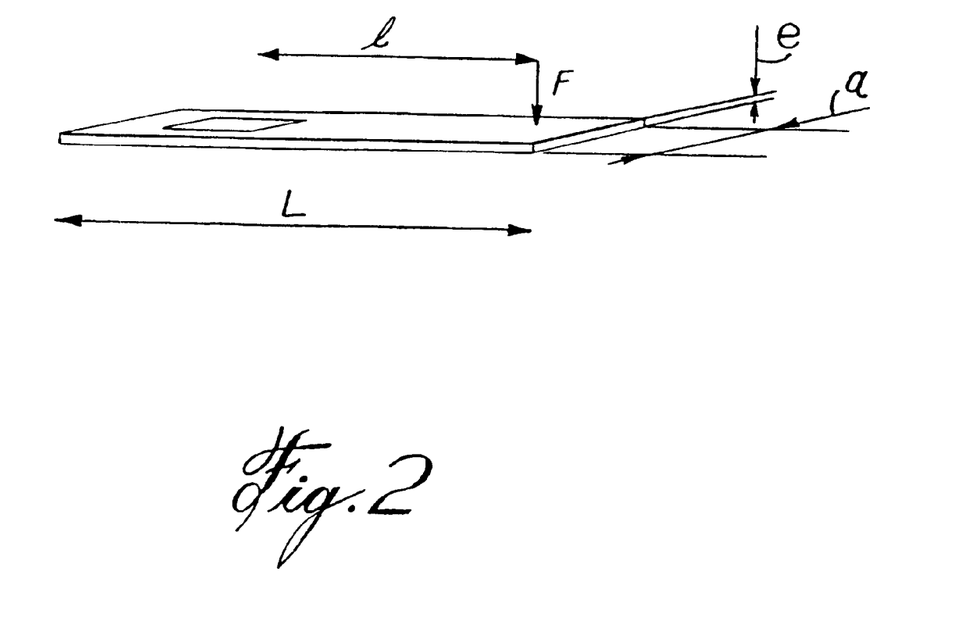
FIG. 2 is a perspective view of the blade.
Figure 3:
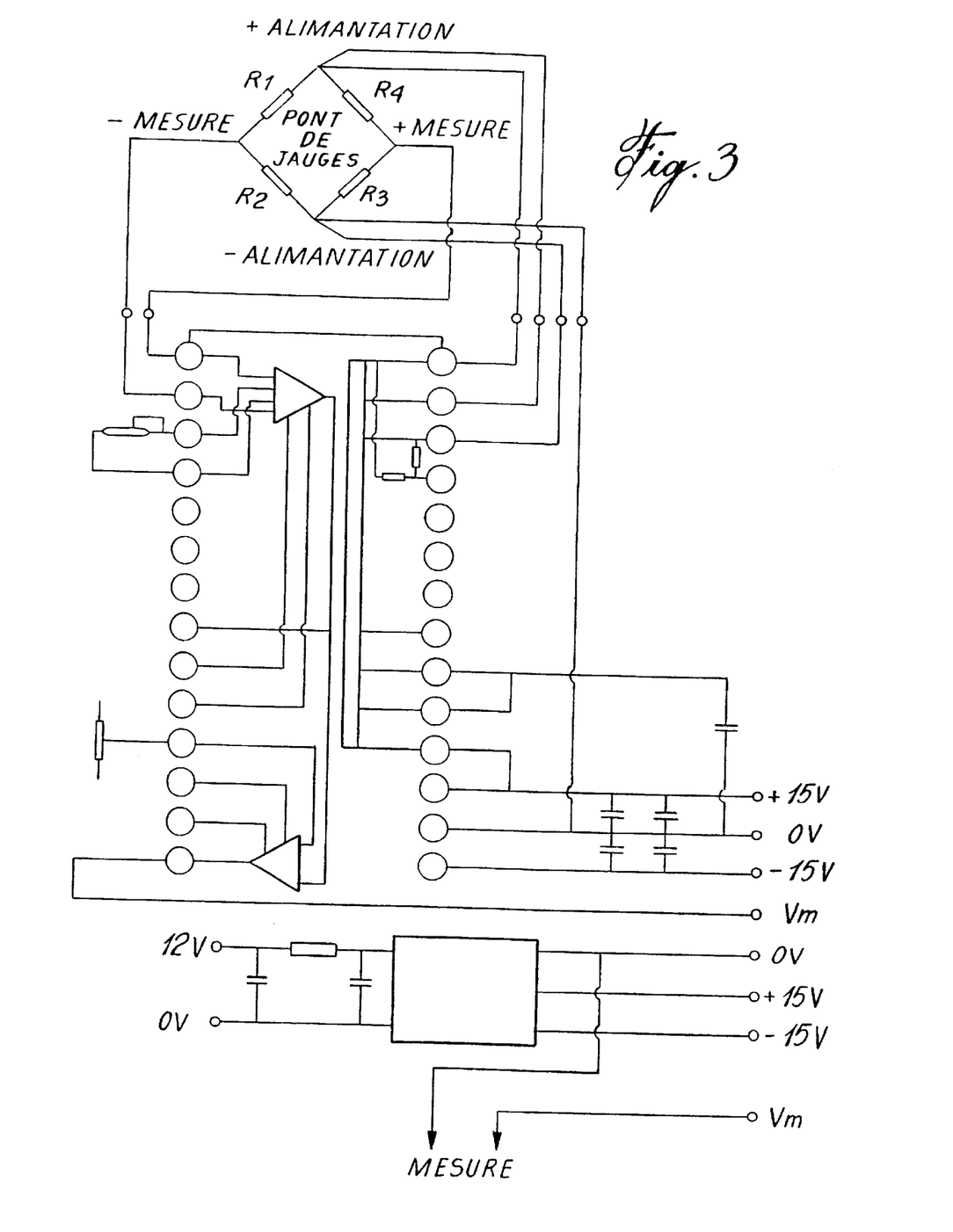
FIG. 3 is a diagram of the circuit.

The functioning of the sensor is as follows. The blade represents a blade as shown in FIG. 2. The deformations measured by each gauge are represented by $\epsilon = 6Fl/Eae.e$ With F: applied force e: thickness of the blade $\epsilon$: deformation l: distance between gauges a: width of the blade E: Young's modulus The deformation determines a variation of the resistance of the gauges according to the sketch of FIG. 3. The voltage measured at the terminals of the bridge are according to the law:

$$De = E/4 \ (DR1/R1 - DR2/R2 + DR3/R3 - DR4/R4)$$

R1 and R3 are the gauges working in tensile stress

R2 and R4 are the gauges working in compression

It is possible to choose that the gauges of adjacent branches of the bridge work in opposite ways and that the gauges of opposite branches work in the same way, all the variations of resistances are added up. Then, $$De = E/4 \ (DR1/R1 + DR2/R2 + DR3/R3 + DR4/R4) = KE/4 \ DI/I$$

E is the excitation voltage of the bridge

K is the gauge factor

DI/I is the total deformation of the 4 gauges

The gauges are Wishay N2A 06 T006Q 350 double gauges. One can of course use any gauge of appropriate dimension and type with the commitment to respect the settings and the connection of the bridge allowing the correct combination of the signals for a blade in flexion following the known techniques.

The signal De is connected to points 1 and 2 of circuit 1B31An which is an analog component from Burr Brown mounted as an amplifier for the input signal. The setting of the amplification gain is assured by the variable resistance mounted between points 3 and 4 of the circuit and the adjustment of the offset by the adjustment of a resistant adjustable divisor bridge fed between two positive and negative reference voltages and for which the mid-point enters on terminal 11. The amplified signal is delivered on terminal 14 of the circuit. A continuous conversion circuit of reference TUC12215 feeds the amplifier circuit and the bridge of gauges.

DETAILED DESCRIPTION OF THE BASIC PROCESS FUNCTIONS ACCORDING TO THE INVENTION

The embodiment consists in taking a sensor and applying between bearing parts 4 and 5 and a compression with the help of a tightening tool. The position of the tightening tool is controlled by an automatic positioning device guided by an adjustment process control computer. The blade bends in function of the constraint of tightening or loosening and the bridge of gauges 2 emits, for each tightening value, a signal amplified by the electronic circuit. Two tightening points allow to simulate the forces of compression and to adjust the offset and the linearity of the curve by an action on the adjustment of the offset then on the gain of the electronic circuit and to consequently obtain points A.B.C.D. (FIG. 4). A minimal tightening force will then be applied to the sensor to obtain a value called low v1 in such a way to obtain the electrical signal value corresponding to point A (FIG. 4). When the desired curve is obtained, one sets up, at the low value, the locking flange. The sensor equipped with its flange is shown at FIG. 5.

This jamming is implemented with the help of a flange, which determines the permanent distance between the bearing parts. The rate of contraction or expansion of the blade is thus constant before it is put in place on the mechanical member. The dimension of the flange is determined during the adjustment of the sensor on the bench at a length L1 which corresponds to a very small expansion, practically always the same, of the blade allowing to obtain a value of electrical signal v1 that is always the same. A bonding process, for example, allows for the coupling of the sensor on the mechanical member. When the two elements are welded one to the other or that no more slipping is possible between the mechanical member and the sensor, the flange is then cut, allowing the sensor to carry out its function. The flange ensures the accuracy of the value of electrical signal v1 after the installation of the sensor. The aim of the present invention is to produce tensile sensors that can easily be implanted on mechanical members in an automatic way and that ensure being able to get the same electrical signal for identical mechanical members. This process concerns many applications and in particular the implantation of sensors to measure the breaking forces of a brake.

Figure 6:
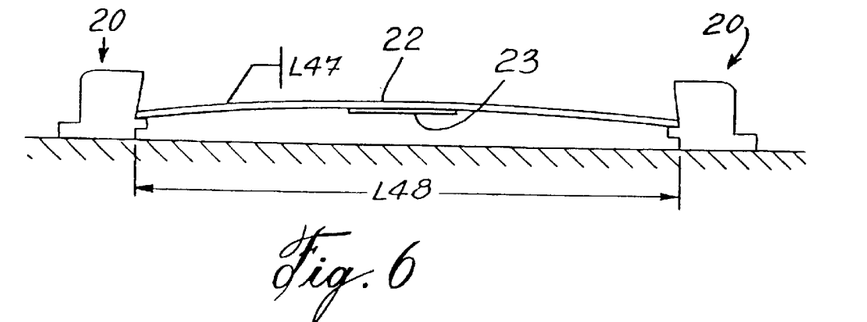
FIG. 6 is an elevation view of the blade in buckling supported by abutments.
Figure 6A:
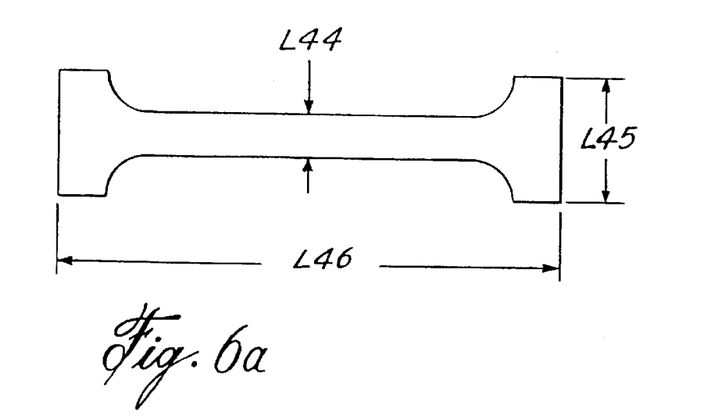
FIG. 6a is a schematic plan view of the blade used as a prototype.

The sensor illustrated in FIG. 6 represents another example which allows a better understanding of the invention. The principal element is made of a thin blade 22 of an elastical material, with or without an initial curve. The blade 22 is illustrated in FIG. 6a. The material can, for example, be a titanium alloy (TA6U) or aluminum (7075). This blade is jammed between two abutments 20 along its longitudinal axis. These two abutments keep the blade in flexion by buckling, in an isostatic way (achieved by letting length L48 between the two abutments being slightly smaller than initial length L1 of the blade, the difference L47-L48 being superior to the maximum expansion of the surface).

Figure 7:
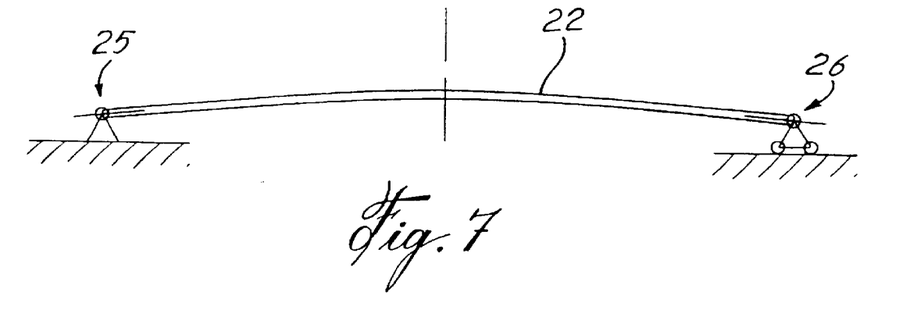
FIG. 7 is a schematic view of the supports of the blade.
Figure 8:
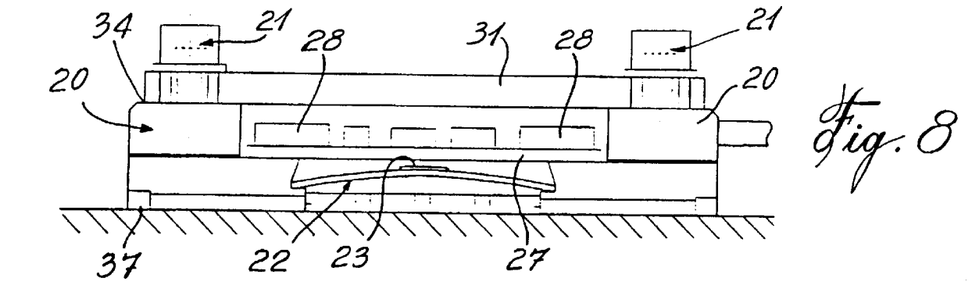
FIG. 8 is an elevation view of the device.
Figure 9:
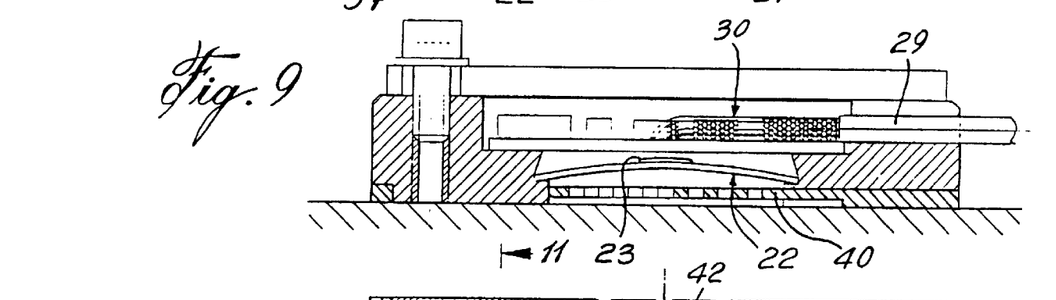
FIG. 9 is a cross-sectional view taken along line 9—9 of FIG. 8.
Figure 10:
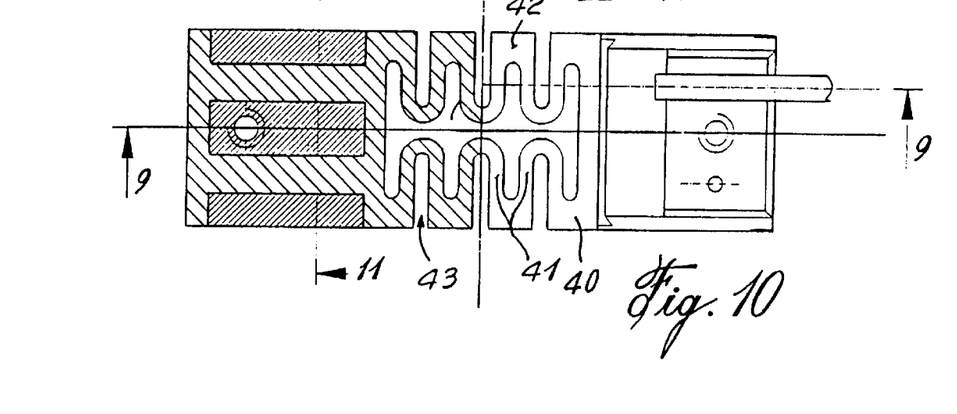
FIG. 10 is a top plan view of the device, partly in cross-section, without the blade.
Figure 11:
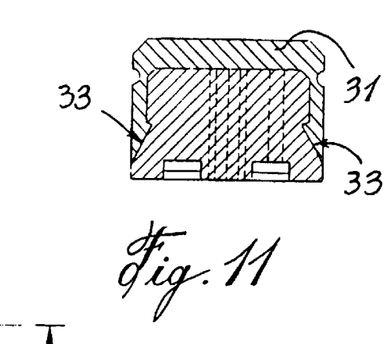
FIG. 11 is a view of one of the sides.

To achieve the isostatic status, the abutments 20 must be as close as possible to FIG. 7, one of the joints 25 locked in x and in y, free to rotate, and the other 26 locked in y, free in x, to allow measurement of the displacement at the other end free in displacement. One can build the abutments in three ways. The first is to machine the abutments directly in the piece as shown in FIG. 6, the second is to bolt or bond the abutments on the piece as shown in FIG. 8 and the last is to link the abutments between them by a low elasticity material to avoid carrying stress to the fastening points.

The expansion or the contraction of length L0 between the abutments 20 provokes a flexion of the blade. A bridge of gauges 23 applied by a thin layer of glue 24, or by another process, to the middle of the blade 22 preferably allows, as known in the prior art, to measure the deformations undergone by the blade 22. This bridge of gauges 23 can comprise resistive semi-conductors, piezo resistive elements, capacitive elements or other.

The bridge of gauges 23 (FIG. 8) is linked to a bearing part 27 of the electronics 28 located over blade 22 and separated from it by a sufficient gap. The bearing part 27 is seated on the abutments 20. The amplifier electronics 28 are then linked to a conductor 29 by a connector 30, which allows to bring the information to the exterior of the device. Only one bridge of gauges can be used, either under or over blade 22. At a superior cost, one can spread the 4 gauges of the bridge two-by-two on each side of the blade, and one consequently obtains a superior sensibility.

The main characteristic of this device is to allow a simple installation because the initial zero setting can be preset before the fastening on the piece. An assembly as illustrated by FIGS. 8 to 11 must then be used. One must add a flange or a hood 31. The hood 31 is of sufficient stiffness and comprises two locking bolts 21, two inclined external faces 33 opposite the abutments 20. There is a little clearance 34 between the bottom of the hood 31 and the top of the abutments 20.

Before the installation of the device on the apparatus on which it will take measures, the hood 31 allows to hold together all parts of the assembly while protecting the blade 22 and the abutments 20. The locking bolts 21 allow to set the initial zero setting by linking the hood 31 to the abutments 20. Once the bottom of the device is bonded to the surface on which one desires to take measures, the locking bolts 21 are taken out. The hood 31 is then free to slide on the inclined faces 33 in a V-shaped throat. At this moment, the hood 31 serves uniquely as a protection against the elements and the accidental manipulations of the blade 22. As it is free to move, no extra stress will be created upon the abutments 20 and the device will be able to efficiently measure the constraints of the piece to be observed.

Zero value setting is one the hardest constraint to hold. Indeed, a release of $1/100$ mm, which is a very small offset in mechanics and is already very costly to obtain represents half or ¾ of the extent of the measurement. The whole of the calibrating operation, zero value setting, sensor installation, and release of the zero value blocking must be achieved with an offset of less than to 1 micrometer. The principle consists of removing the movements of the abutments of the blade provoked by the tensions put in place during the tightening/loosening. The rotations along Oz and Ox are removed by the support of the superior face of the abutment on the inferior face of the hood 31. This support is assured by the locking bolts 21. Common parallelism and flatness tolerances, without dimensional tolerance, are sufficient to ensure precision. The rotation along Oy is blocked by the presence of the inclined faces 33 on the side of the abutment in the interior of the flanks of the hood 31. One cannot count on a simple adjustment with an offset, for the reasons listed above. These faces come in contact slightly before the superior face, which prevents the rotation movement. The elasticity of the flanks thereafter allows the contact with the superior face. During operation, once the bolts are released and/or withdrawn, the hood is free in the V-shaped throat.

As with all tensile sensors, this sensor is submitted to its own expansion and to the expansion of the machined structure as a function of the temperature. This expansion will provoke a signal at the gauges level. In many cases, the signal is undesirable and must be eliminated to only keep the signal from the phenomenon to be measured. No tensile sensor currently carry out an automatic thermal compensation by playing with the characteristics of the resistivity as a function of the temperature. In the present device, the isostatic status of the blade allows to easily balance this undesired expansion according to principles described in FIG. 14.

Figure 14:
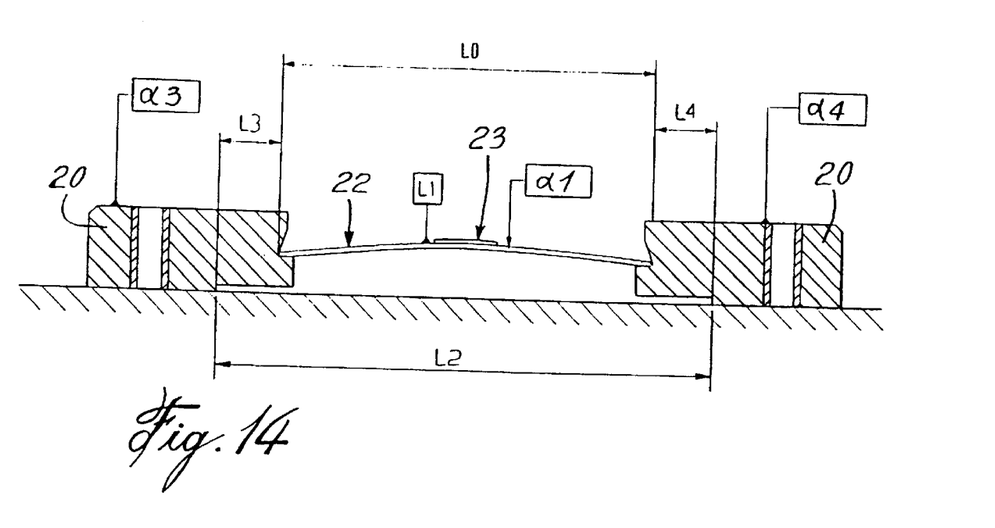
FIG. 14 is a schematic view of the thermal compensation principle.

Wherein:

L0=length between the abutments

L1=free length of the blade

L2=expansion length of the substrate

L3=free expansion length of the blade support 3

L4=free expansion length of the blade support 4

$\alpha 1$=expansion coefficient of the blade $\alpha 2$=expansion coefficient of the substrate $\alpha 3$=expansion coefficient of the support abutment 3

$\alpha 4$=expansion coefficient of the support abutment 4

If $\Delta L0\,(\Delta T)=(\alpha 1+1)*L1*\Delta T$, the gauges disposed in a full bridge balance out the natural expansion of the blade and no signal is recorded.

Since $\Delta L0\,(T)=\alpha*\Delta T*L1$, it is sufficient to have $\alpha 2*L2-(\alpha 3*L3+\alpha 4*L4)=\alpha 1*L1$ to be able to balance out the difference of expansion between the sensor and the surface. The residual compensation can be achieved by resistors disposed in series or in parallel on the Wheatstone bridge or by a digital device.

When one wants to increase the sensitivity of the sensor by the shortening of the blade, the critical buckling force which represents 99% of the stress on the abutments can increase in proportions such that it will harm the precision of the device and of the zero value setting. A solution consists in balancing out the stress of the blade, which tends to repel the abutments, by a spring, which holds them together. Then, the result on the fastening points is only the difference the between stresses. A very economical way to achieve this balancing spring is to use a frame 40 in molded plastic or in another material such as titanium or aluminum for example, which serves at the same time as a junction piece for the abutments and as frame for the sensor (see FIG. 10). The frame 40 comprises four gantries 41 and crossbeams 42. The gantries 41 are attached by the central portion of the crossbeams 42. This acts as a spring for the blade. One can modulate the stiffness of this spring by varying, in addition to the sections of the gantries, the free length of the cross-beam by varying the depth of the slots 43 and the modulus of elasticity of the material (reinforced plastic, plastic, metal, etc.).

Following are the steps of operation of the monobloc sensor as illustrated in FIGS. 8 to 11. The first step is the installation and support of the blade. During installation, the sensor undergoes an elongation proportional to the buckling stress of the blade 22 and to the stiffness of the frame 40. The stress of the blade and of the frame balance out for a specific elongation and keep the blade in position. Afterwards, one must set the initial operational point. The abutments 20 are locked on a calibration table allowing to move them one with respect to the other with high precision up to the desired pre-constrained value for the blade 22, locking bolts 21 being loosened. One must then maintain this setting. The bolts 21 are then tightened to a predetermined torque value. Both abutments 20 are then fastened with respect to the hood 31 and the blade is perfectly maintained at to the desired zero value.

Finally, one installs the whole on the piece to be measured. The two abutments are bonded, welded or bolted permanently (as described on page 11, lines 11 to 20) on the surface to be equipped with the instrument. Once the fastening is firmly established, the bolts 32 are withdrawn and the sensor is ready to function with the preset value. The stiffness of the frame 40 is sufficient to hold the blade during the installation, but is calculated to provoke only weak tensions on the fastening points during operation.

The preferred way for the inventor to carry out his invention can be slightly modified to change the properties of the sensor and allow different measurements. For example, one can modify the parameters of the blade in the following way. If one increases the thickness of the blade 22, one will get more sensitivity with more stress. One will use a long blade with a constant weak effort for great displacements or a short blade with great sensitivity for the measurement of small deformations. If one reduces the width of the blade, one reduces the stresses on the abutments. If one increases the distance between the axis of the abutments for the same blade, one increases the sensibility. One can eliminate the problems of unstable equilibrium due to buckling by giving an initial plastic deformation to the blade.

Figure 15:
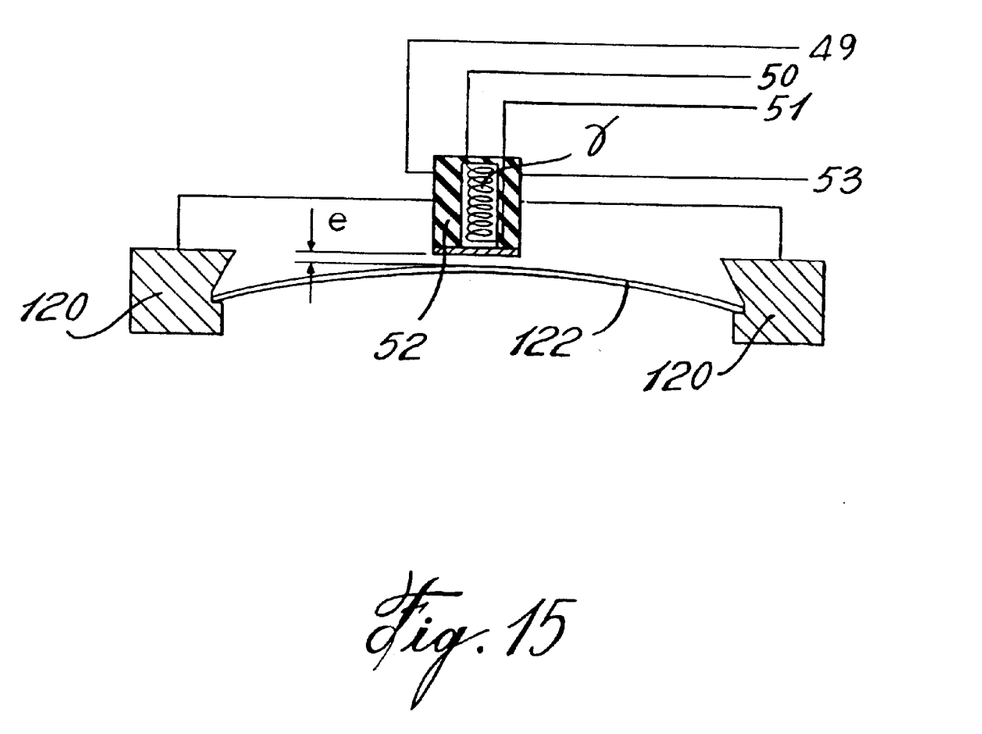
FIG. 15 is an elevation view of the device completed by a Hall effect sensor.

One can also change the bridge of gauges 23 for a different device, such as a Hall effect sensor (as shown in FIG. 15) or an optical sensor. The Hall effect sensor acts as an electromagnet more or less excited when the blade 22 is brought closer or further from its coil 52. Whatever way is chosen to pick up the deformations applied to the blade, this signal shall be transformed in electrical pulses to communicate with the exterior of the device.

By slightly modifying the hood 31 of the apparatus, it is also possible to make a calibration on site. One of the abutments 20 is longitudinally abutted by its external face on the hood 31. The opposite abutment is pushed by a screw (not shown) until one obtains the desired constraint value on the blade.

Figures 12, 13:
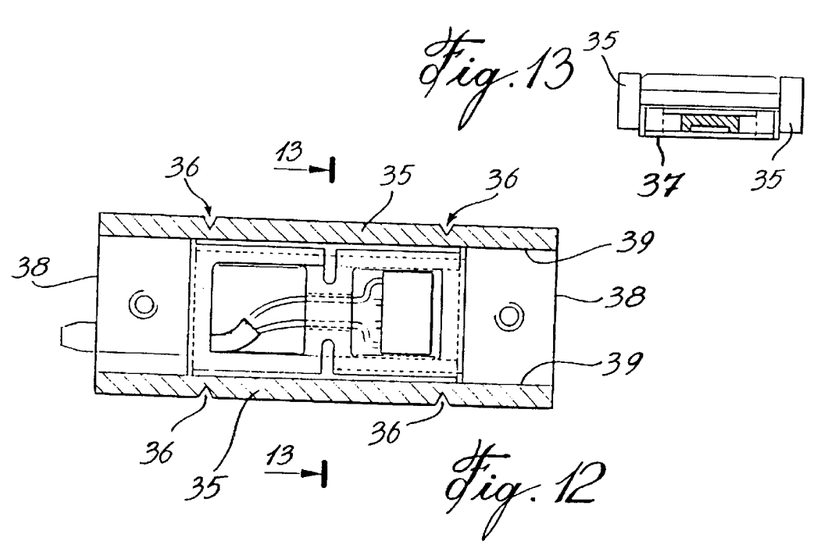
FIG. 12 is a cross-sectional view from the center of the device with breakable plates.
FIG. 13 is an elevation view of one the sides with the plates.

To set the zero, is it possible to use a breakable strip. FIGS. 12 and 13 illustrate this method. The inventor will use two strips 35 made of a fragile material and sufficiently rigid such as glass or ceramic. Eventually, one or many notches 36 are made to create a rupture point. Finally, the calibrating bench should allow a very precise displacement such that the sensor lays on its support faces 37 and is guided by its faces 38 perfectly parallel to the support faces of the blade 22 from which at least one moves to achieve the deformation of the blade. The operation mode of this principle is the following: the sensor is held by its faces 37 and is guided by its faces 38, one of which serves as a stationary reference and the other as a mobile reference. The blade 22 is brought to the desired position by the displacement of the face 38. One then sticks, by the faces 39, the strips 35 on the abutments 20. Once the glue is dried up, the plates 35 maintain the sensor in a pre-constrained position and it can be released from the bench. One then fastens the sensor on the piece to be measured by its faces 37. Once the fastening is achieved, one breaks the strips 35 with pliers or by shock to release the sensor and allow its operation.

This method has many advantages which are related to the basic principles used. The first advantage is the use of isostatic buckling which gives a weak stress to the abutments. The stress at the abutments is considerably reduced by the fact that, after buckling, the blade works in flexion and no longer in tensile compression. For a blade of 25*5*0.3 mm and a displacement of 0.02 mm, the stress goes from 252 N to 33.7 N. Furthermore, in the case of a blade in tensile stress, it is impossible to correctly fasten a blade of this dimension to avoid the slipping of the fastening points (the sensitivity of measurement is in the order of 0.03 micrometers), and one can easily create constraint concentrations yielding a permanent deformation of the blade. The interest in this device is the total absence of moment on the fastening points and weaker stresses which make the device suited for bonding, as the glues generally resist well to shear stress and the practically constant stress on the range of measurements, which guarantees the characteristics on a wide range of measurements.

The isostatic buckling also allows a very good return to zero and a weak hysteresis. In every fastening system, when the stress go beyond a certain threshold, slipping occurs. At the return, the elastic strain forces of the system are weaker than the friction forces and the system takes a new equilibrium position at zero. This effect is produced at each cycle, giving a progressive slip from the zero value or a high uncertainty if the stress change direction. In this case, the stress is always present in the same direction on the range of the measurements and is always present, its value being low and constant enough, which guarantees the weakest slip possible of the zero value.

What is claimed is:

1. A tensile testing sensor mountable on a mechanical member in which forces to be measured develop, comprising a bendable flat metal blade provided with measuring gauges implemented and positioned on the blade and equipped with a temporary and removable mechanically locking flange placed during calibration between the bearing parts of the sensor blade, said blade being sensitive to mechanical tensile and compressive deformations sustained and transmitted via two adjustable bearing parts in relation to the mechanical member in which forces develop, said temporary flange being removed from said sensor after said sensor is mounted on said member, whereby said flange is used to lock said blade into a calibrated position during said calibration and installation and is removed when said sensor is mounted on said member and said sensor is used to measure forces.

2. A tensile testing sensor according to claim 1, wherein the locking flange emits an electrical value signal in relation with characteristics of installation of the flange.

3. A tensile testing sensor according to claim 1, wherein the flange is mounted between the bearing parts of the sensor blade.

4. A tensile testing sensor according to claim 1, wherein the flange is subject to a rupture after the sensor is mounted on the member and wherein there is a relationship between the value of the pre-constrained force to which the blade is submitted and the value of the electrical signal delivered by the sensor before the rupture of the flange.

5. A tensile testing sensor according to claim 1, wherein the electronic calibration, adjustments and the locking flange are embodied at the adjustment bench.

6. A tensile testing sensor according to claim 1, wherein the flange is a rigid element which is cuttable when the tensile testing sensor is coupled to the mechanical member.

7. A tensile testing sensor according to claim 1, wherein the mechanical locking flange is on the shape of a rigid hood and the bearing parts of the sensor blade is fastenable jointly to the hood during the setting.

8. A tensile testing sensor according to claim 7 wherein the hood comprises means to allow the bearing parts in the shape of abutments to slide in the hood on a longitudinal axis in the direction of the blade and means are provided to fasten the bearing parts to constrain the movement of these pieces relatively to the hood.

9. A tensile testing sensor according to claim 1, wherein the bearing parts are abutments and the blades is elastically in isostatic support at its ends, on the abutments, maintained in flexion by buckling.

10. A tensile testing sensor according to claim 9 wherein the blade was subjected to a permanent deformation destined to give it an initial curvature.

11. A tensile testing sensor according to claim 8, wherein the abutments can be released to assure the freedom of operation once the sensor is mounted on the mechanical member.

12. A tensile testing sensor according to claim 11 wherein the hood comprises at least two parallel flanks with inclined faces inside the hood which give support corresponding to each abutment, and the interior faces of the flanks have longitudinal grooves to allow movement of the abutments on a longitudinal axis.

13. A tensile testing sensor according to claim 8, wherein the abutments are bound to a device forming a spring antagonistic to the blade.

14. A tensile testing sensor according to claim 13 wherein the spring is made from a flat member to which one has added elasticity using notches.

15. A tensile testing sensor mountable on a mechanical member wherein forces to be measured develop, comprising a flat elastic blade in isostatic support on its ends between to adjustable abutments and kept in flexion by buckling, means to measure the deformation of the part by which the adjustable abutments are joined integrally; wherein said abutments adjusted to calibrate buckling of said blade prior to final mounting of said sensor to said member.

16. A tensile testing sensor according to claim 1 wherein said flat blade is generally rectangular and has a central portion and two ends and wherein the width of the central portion is less than the width of the two ends.

17. A tensile testing sensor according to claim 15 wherein said flat blade is generally rectangular and has a central portion and two ends and wherein the width of the central portion is less than the width of the two ends.

18. A tensile testing sensor according to claim 16 wherein the flat blade is I-shaped.

19. A tensile testing sensor according to claim 17 wherein the flat blade is I-shaped.

20. A method of calibrating a tensile testing sensor mountable on a mechanical member wherein forces to be measured develop comprising:

providing two adjustable bearing parts mountable in relation to the mechanical member;

placing a bendable flat metal blade having measuring gauges between said two adjustable bearing parts, said blade being sensitive to mechanical tensile and compressive deformations sustained and transmitted via the two adjustable bearing parts;

during calibration, placing a temporary mechanically locking flange and locking said blade between said bearing parts;

mounting said sensor on said member;

removing said temporary flange from said sensor after said sensor is mounted on said member;

whereby said flange is used to lock said blade into a calibrated position during said calibration and installation and is removed when said sensor is mounted on said member and said sensor is used to measure forces.

21. A method according to claim 20, further comprising said locking flange emitting an electrical value signal in relation with characteristics of installation of the flange.

22. A method according to claim 20, wherein said placing the flange comprises mounting the flange between the bearing parts of the sensor blade.

23. A method according to claim 20, wherein said removing comprising creating a rupture of the flange and wherein there is a relationship between the value of the pre-constrained force to which the blade is submitted and the value of the electrical signal delivered by the sensor before the rupture of the flange.

24. A method according to claim 20, wherein said calibration, said placing of the blade and said placing of the flange are embodied at the adjustment bench.

25. A method according to claim 20, wherein said removing comprises cutting said flange.

26. A method according to claim 20, wherein the bearing parts are abutments and said placing the blade comprises placing the blade in elastical isostatic support at its ends, on the abutments, and maintaining the blade in flexion by buckling.

27. A method according to claim 26, further comprising permanently deforming said blade to give it an initial curvature.

28. A method according to claim 27, further comprising releasing the abutments to assure the freedom of operation once the sensor is mounted on the mechanical member.

* * * * *